H. N. WICKOFF.
Milk-Cans.

No. 148,638.   Patented March 17, 1874.

Attest:
Edw. N. Dorn
W. C. Thompson

Inventor:
Horatio N. Wickoff
Burridge & Co.
Attys.

UNITED STATES PATENT OFFICE.

HORATIO N. WICKOFF, OF CHAGRIN FALLS, OHIO.

IMPROVEMENT IN MILK-CANS.

Specification forming part of Letters Patent No. 148,638, dated March 17, 1874; application filed February 27, 1874.

*To all whom it may concern:*

Be it known that I, HORATIO N. WICKOFF, of Chagrin Falls, Cuyahoga county, Ohio, have invented a certain Improved Milk-Can, reference being had to the accompanying drawing making part of this specification, in which—

Figure 1:
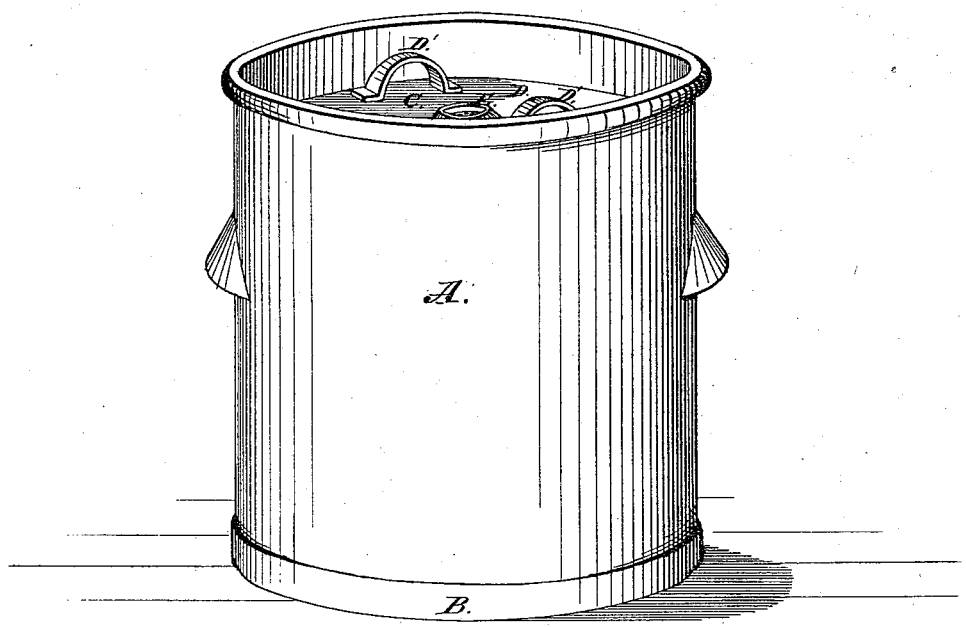
Figure 2:
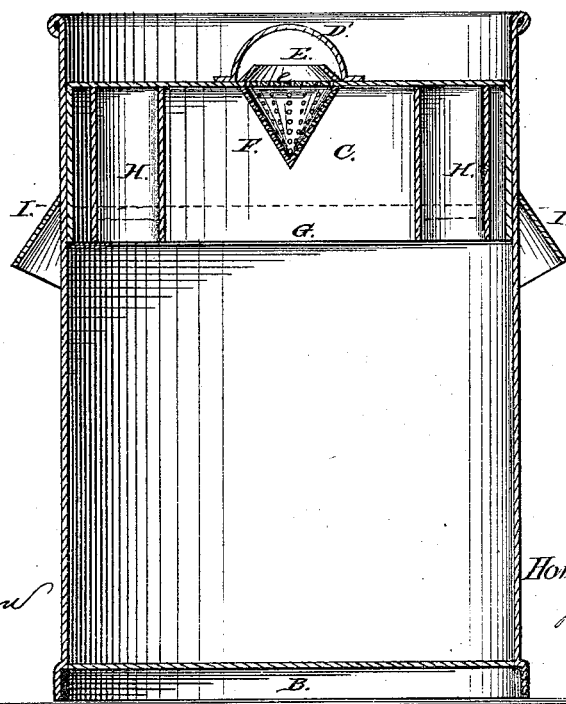

Figure 1 is a perspective view, and Fig. 2 a vertical section.

Like letters refer to like parts in the drawings.

The nature of this improvement consists in the construction of the can with a cover that will allow the free escape of the heat and animal odor of the milk, while the slopping and injurious agitation are prevented, which is attained by the formation of one or more air-chambers and vent in the cover, as hereinafter more fully set forth.

Fig. 2 shows the interior construction of the can and cover.

A is the can, cylindrical in form and of equal diameter. The bottom is strengthened by a base-piece at B. The cover C has a diameter that will allow it to move freely within the body of the can. The depth of the cover is about one-third the length of the can. The head of the cover D is provided with handles D' for convenience of adjusting to or from the can. The center of the cover is provided with the frustum of a hollow cone extending upward, as seen at E, within which is a vent, e, covered with perforated tin or wire-gauze, and beneath this vent there is attached a perforated inverted cone, F, one or both of which may be used. The rim of the cover extends downward into the body of the can, as shown at G, and the under side of the head is provided with one or more air-tight chambers, H, open only at the bottom.

The operation is as follows: If the can is filled or supplied with milk, say, to the dotted line I, the air in the chamber H becomes compressed, and this prevents the cover from sinking, and also prevents the milk from injurious agitation in its transit from the yard to the point of delivery, and the vent e admits of the free escape of heat and animal odor, while the slopping of milk is prevented in its transit in the can.

The form or number of air-chambers is not essential. They should be of capacity to secure the floating of the cover.

I claim—

In milk-cans, the air chamber or chambers H, vent e, and cover C, in combination with the can, arranged substantially as and for the purpose set forth.

HORATIO N. WICKOFF.

Witnesses:
 W. H. BURRIDGE,
 A. G. HEYLMUN.